Nov. 18, 1969　　　TETSUO MAEDA　　　3,478,617
GEARBOX CHANGE LEVER FOR BICYCLES

Filed Sept. 26, 1967　　　3 Sheets-Sheet 1

INVENTOR.
Tetsuo Maeda
BY

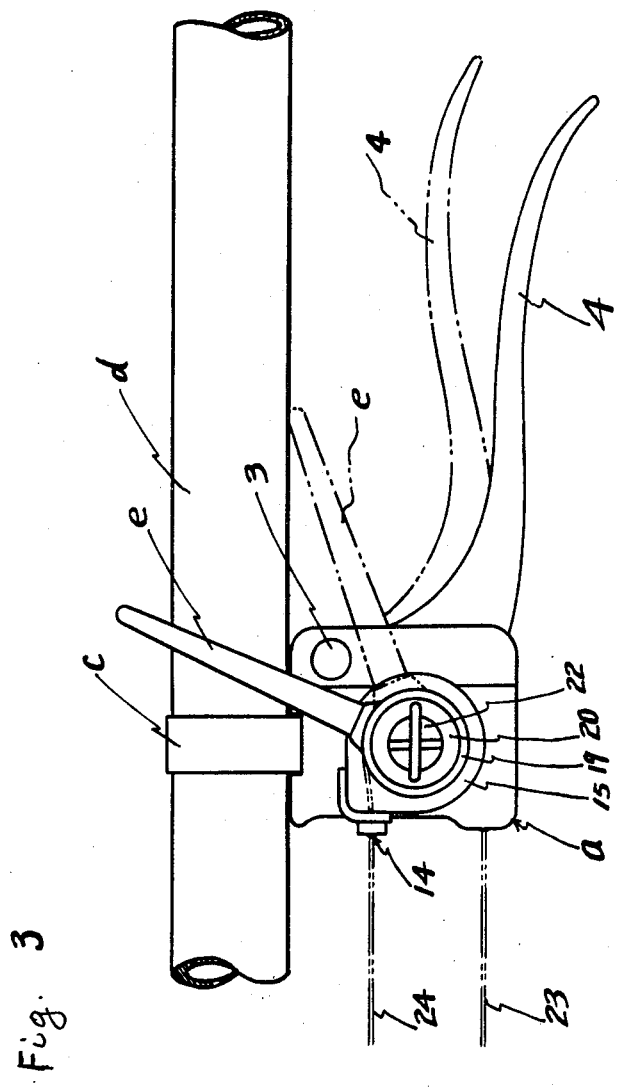

United States Patent Office 3,478,617
Patented Nov. 18, 1969

---

3,478,617
GEARBOX CHANGE LEVER FOR BICYCLES
Tetsuo Maeda, 12/1-ochome, Hamadera-Koen-cho,
Osaka Prefecture, Sakai, Japan
Filed Sept. 26, 1967, Ser. No. 670,571
Claims priority, application Japan, Sept. 1, 1967,
42/75,105
Int. Cl. G05g *11/00*
U.S. Cl. 74—489                                1 Claim

ABSTRACT OF THE DISCLOSURE

A gearbox change lever for bicycles comprising a housing adapted to be secured to the handle of a bicycle, a gearbox change lever axially mounted pivotally on one side of the housing and a brake lever axially mounted pivotally to the housing.

---

The present invention relates to a gearbox change lever for bicycles in general, and to a speed change lever provided on a bicycle in order to shift the gear in its gearbox.

Generally a conventional lever of this type is fixed to the frame of the bicycle or its handle by means of a binding band attached thereto so as to shift the gear in the gearbox through an intermediate wire by rotating the lever, in which case, however, the fixed position of the change lever becomes irregularly different, because of the lever being fixed individually. For instance, when it is fixed to the frame of the bicycle as in common practice, the cyclist must release his hold of the handle of the bicycle, which will cause danger, when he is forced to make an unexpected sudden stop.

It it an object of the present invention to provide a gearbox change lever which solves the above-mentioned shortcomings of the conventional levers.

It is another object of the present invention to provide a gearbox change lever axially on one side of the fixing body to which it is fixed, so that the cyclist can always shift the gears of the gearbox smoothly in a safe condition, while eliminating binding bands and the like used for the change levers, and making it easier to shift the gears.

With these and other objects in view which will become apparent in the following detailed description, the present invention will be clearly understood in connection with the accompanying drawings, in which:

FIGS. 3 and 4 are fragmentary side elevational views of the lever affixed on the handle of the bicycle.

Figure 1:
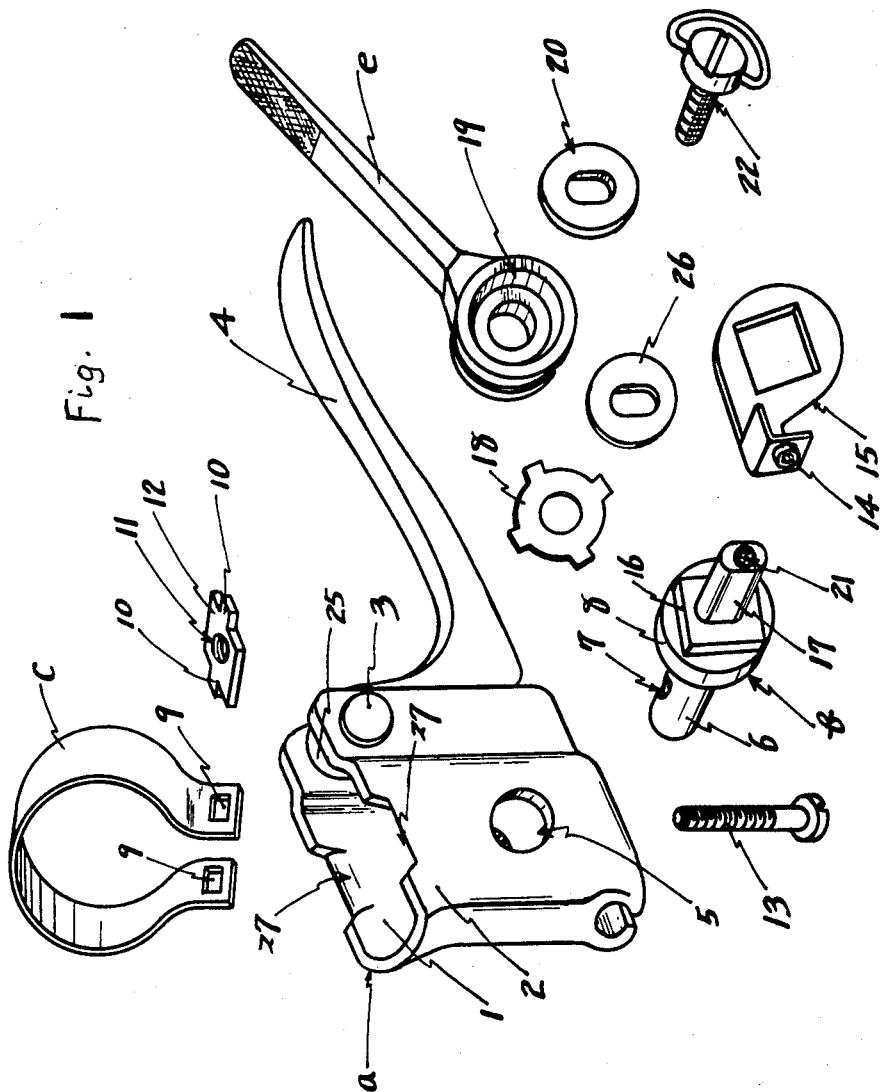
FIGURE 1 is an exploded perspective view of the dissembled parts of both the brake and change lever.
Figure 4:
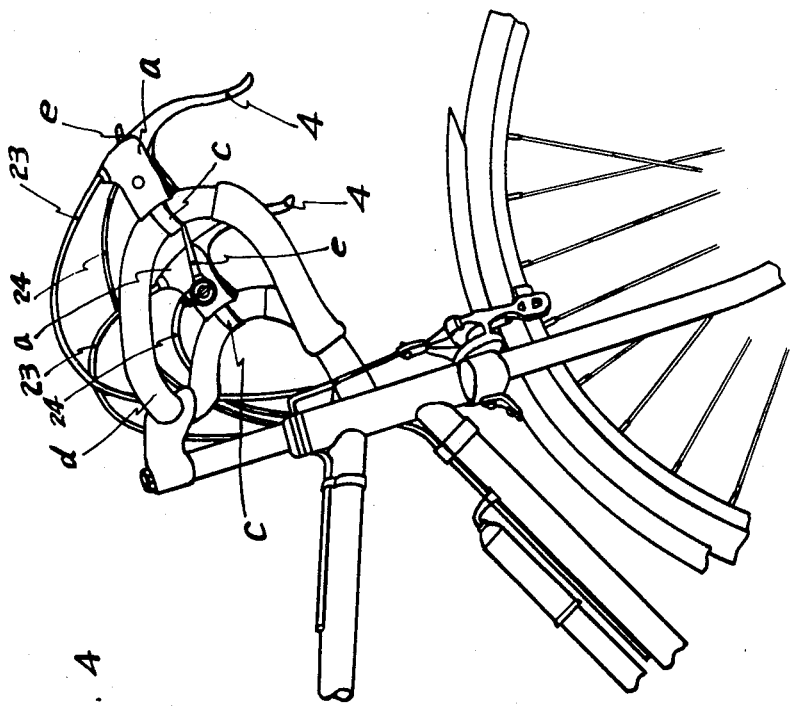
Figure 2:
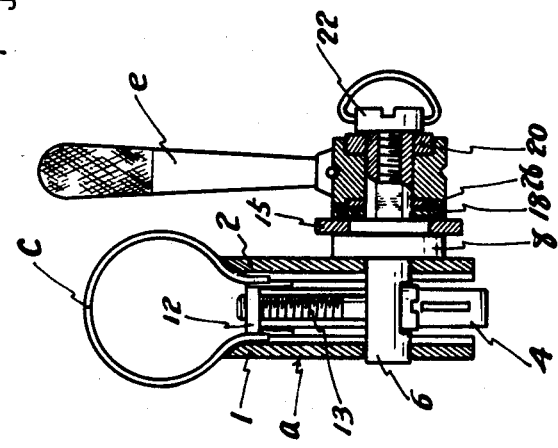
FIG. 2 is a partial axial cross-section of the assembled condition of the lever.

Referring now to the drawings, and more particularly to FIG. 1, a fixing body *a* for the brake lever is formed with a U-shape (the U facing sideways), and includes a left wall 1 and a right wall 2, and axially secures tip 25 of a brake lever 4 to the rear part of the fixing body *a* by means of a supporting axle 3 extending through both the right wall 2 and the left wall 1. The walls 1 and 2 are formed with a hole 5 therethrough in the central portion thereof. An axis-like body *b* is provided in its central part with a flange 8 abutting the outside portion of the wall 2. The axis-like body *b* has an axle 6 which is inserted into the holes 5 of the fixing body *a* and which is formed with an opening 7 extending upwardly and downwardly between the central portions of both the right and left walls. A binding band *c* is formed in a circularly curved shape and has two parallel lower tips in which are formed click holes, into which clicks 10 are pushed and fixed by a binding fitting 12 having a threaded hole 11 in its central part. The lower part of the binding band *c* is inserted between the walls 1 and 2 from the upper part of the fixing body *a*. A screw 13 extends through the opening 7 of the axle 6 of the axis-like body *b*, upwardly, and the upper end of the screw 13 is screwed into the screw hole 11 of the binding fitting 12. Both the band *c* and the fixing body *a* are mutually connected and fixed to a bicycle handle bar *d* (FIG. 4) by fitting the binding band *c* on the handle bar *d* and tightening the screw 13 thereupon.

Notched concave portions 27 are provided on the upper part of both the walls 1 and 2 of the fixing body *a*, so that when both lower tips of the band *c* are positioned into the concave portions 27, upon tightening the screw 13, the band *c* and the fixing body *a* will be integrally united as one body.

A subsidiary fittting 15 has a guide hole 14 for a wire 24 for actuating the gears and is formed with a square hole and which fits in and against square flange 16 formed on the axis-like body *b*. The axis-like body has an outside axial part 17 on which is placed in the following order, a spring washer 18, a washer 26, an axially fixing part 19 of a change lever *e* and a washer 20 for preventing slipping of the axially fixed part 19. A screw hole 21 is formed in the center of the outside axial part 17 which part is secured by a set-screw 22, so that the change lever *e* may be axially fixed to the axis-like body *b* in a freely rotary condition.

The change lever device of the gearbox of the bicycle according to the present invention formed as set forth above is commonly fixed near the gripping part of the handle of the bicycle and wire 23 for the brake and wire 24 for changing the speed are respectively fixed to the brake lever 4 and to the change lever *e* for conveniently shifting the gears. Since the change lever *e* is axially positioned on one side of the fixing body *a* on which is axially positioned the brake lever 4, the brake lever 4 is always on hand whenever the change lever *e* is to be used. For instance, since one can readily shift gears by the change lever *e*, with the palm of the cyclist's hand placed on the handle bar *d* and the forefingers and little fingers laid along the brake lever 4, the change lever *e* can be used very quickly and safely whenever required, either in ordinary circumstances or an emergency. At the same time since the change lever *e* can be fixed with the binding band *c* of the brake lever 4, all the respective parts can be assembled very securely and firm, and the entire structure can be simplified, improving its appearance as well.

What I claim is:

1. A gearbox change lever for a bicycle, comprising:
    a fixing body,
    a gear change lever axially positioned on one side of said fixing body,
    a brake lever axially positioned on said fixing body, and
    said fixing body comprises opposite walls and having a U-shape, said opposite walls formed with opposed holes at substantially the center thereof and formed with notched concave portions at the top of said opposite walls, said fixing body being disposed so that the open end of the U-shaped fixing body faces sideways,
    said brake lever being pivotally mounted between said opposite walls at the ends thereof and extending laterally therefrom,
    an axis-like body including an axle and a first flange larger than said opposed holes, said axle extending through said opposed holes in said fixing body and said first flange adjacent the outer surface of one of said opposite walls, in including an opening through said axle oriented vertically, a substantially circular band adapted to be positioned about a handle bar and having parallel lower tips formed with click holes therein, said band positioned on said notched concave portions with said lower tips passing between said opposite walls of said fixing body, a binding fitting having opposite extensions constituting clicks substantially complementary to said click holes and pushed therein, said binding fitting having a threaded hole therein, a screw extending through said opening in said axle of said axis-like body and screwed into said threaded hole in said binding fitting thereby integrally uniting said fixing body and band, said axis-like body including a second flange secured to said first flange and smaller at least in part than said first flange and having non-rounded edges, said axis-like part further including an outside axial part extending from the center of said second flange and having a screw hole at its free end, a subsidiary fitting having an opening complementary to said second flange and positioned thereabout, and including a guide hole adapted to secure a gear change wire therein, said gear change lever including an axially fixing part rotatably disposed on said outside axial part, a spring washer positioned on said outside axial part between said axially fixing part and said second flange, a washer on said outside axial part on each side of said axially fixing part, and a set screw against said one of said washers adjacent the free end of said outside axial part and screwed into said screw hole.

References Cited

UNITED STATES PATENTS 1,319,627 10/1919 Sentinella _____ 74—489

FOREIGN PATENTS 478,734 3/1953 Italy.
490,326 1/1930 Germany.
17,296 1910 Great Britain.
26,436 1910 Great Britain.

MILTON KAUFMAN, Primary Examiner